United States Patent [19]
Tratz et al.

[11] Patent Number: 5,769,007
[45] Date of Patent: Jun. 23, 1998

[54] BULK MATERIAL HEATING CHAMBER EQUIPPED WITH HEATING TUBES

[75] Inventors: Herbert Tratz, Ottensoos; Helmut Werdinig, Nurernberg; Joachim Boretzky, Adelsdorf; Anton Ebert, Ellwangen-Schrezheim, all of Germany

[73] Assignee: Siemens Aktiengesellschaft, Munich, Germany

[21] Appl. No.: 518,009

[22] Filed: Aug. 22, 1995

[30] Foreign Application Priority Data

Aug. 23, 1994 [DE] Germany ............... 44 29 908.7

[51] Int. Cl.⁶ .................................................. A47J 36/00
[52] U.S. Cl. .................... 110/246; 110/229; 110/258; 432/108
[58] Field of Search .................... 110/246, 247, 110/257, 258, 226, 229; 432/103, 108; 34/168, 173, 174, 179, 182, 183

[56] References Cited

U.S. PATENT DOCUMENTS

| | | | |
|---|---|---|---|
| 4,028,817 | 6/1977 | Winstel | 165/DIG. 2 |
| 4,589,354 | 5/1986 | Faehnle | 110/246 |
| 4,842,049 | 6/1989 | Dodds | 165/46 |
| 4,889,060 | 12/1989 | Ettehadieh | 110/246 |
| 5,103,745 | 4/1992 | Harloff | 110/246 |

FOREIGN PATENT DOCUMENTS

| | | |
|---|---|---|
| 0302310 | 8/1990 | European Pat. Off. . |
| 2 323 959 | 4/1977 | France . |
| 505561 | 5/1922 | Germany . |
| 382 865 | 10/1923 | Germany . |
| 1 931 148 | 1/1971 | Germany . |
| 29 44 693 | 5/1981 | Germany . |
| 3702318 | 1/1988 | Germany . |
| 3706771 | 12/1988 | Germany . |
| 3830153 | 3/1990 | Germany . |
| 9319041 | 4/1994 | Germany . |
| 43 29 871 | 3/1995 | Germany . |
| 2 097 910 | 11/1982 | United Kingdom . |

OTHER PUBLICATIONS

"The Engineer" Publ. vol.233,Nr.6021, Jul. 1971, New twist Apollo cools oil better.

Primary Examiner—Denise L. Ferensic
Assistant Examiner—Susanne C. Tinker
Attorney, Agent, or Firm—Herbert L. Lerner; Laurence A. Greenberg

[57] ABSTRACT

A heating chamber or low-temperature carbonization drum has an interior receiving bulk material or trash and has a longitudinal axis about which the heating chamber or drum is rotatable. A number of heating tubes through which a heating gas can flow in a given direction, are disposed in the interior of the heating chamber or drum, are oriented approximately parallel to one another, and have an end region as seen in the given flow direction. Turbulators are disposed inside the heating tubes in the end region.

17 Claims, 4 Drawing Sheets

BULK MATERIAL HEATING CHAMBER EQUIPPED WITH HEATING TUBES

BACKGROUND OF THE INVENTION:

Field of the Invention:

The invention relates to a heating chamber being rotatable about its longitudinal axis and receiving bulk material, in particular a low-temperature carbonization drum receiving trash, having a number of heating tubes being disposed in the interior of the heating chamber or drum and oriented approximately parallel to one another, through which a heating gas can flow.

The heating chamber is preferably used for the thermal disposal of trash, in particular as a low-temperature carbonization drum for the low-temperature carbonization-combustion process.

In the field of waste disposal, the so-called low-temperature carbonization-combustion process has become known. The process and a system operating by it for thermal trash disposal are described, for instance, in European Patent 0 302 310 B1, corresponding to U.S. Pat. No. 4,878,440 and in German Published, Non-Prosecuted Application DE 38 30 153 A1. The system for thermal trash disposal by the low-temperature carbonization-combustion process includes as its essential components a low-temperature carbonization device (low-temperature carbonization drum, pyrolysis reactor) and a high-temperature combustion chamber. The low-temperature carbonization device converts the trash, which is fed in through a trash transport device, into low-temperature carbonization gas and pyrolysis residue (solid low-temperature carbonization material), by a process of low-temperature carbonization or pyrolysis that proceeds substoichiometrically. The low-temperature carbonization gas and the pyrolysis residue are taken, after suitable preparation, to the burner of the high-temperature combustion chamber. Molten slag is produced in the high-temperature combustion chamber and removed through an outlet and is in glass-like form after cooling. The resultant flue gas is taken to a chimney as an outlet through a flue gas line. Built into the flue gas line are, in particular, a waste heat steam generator as a cooling device, a dust filter system, and a flue gas cleaning system. Also located in the flue gas line is a gas compressor, which is disposed directly at the outlet of the flue gas cleaning system and may be constructed as a suction blower. The built-in gas compressor serves to maintain a negative pressure, however slight, in the pyrolysis drum. Through the use of this negative pressure, flue gas is prevented from escaping to the outside environment through the ring seals of the pyrolysis drum.

The trash transport device carries trash of various kinds, for instance comminuted household garbage, industrial waste in a form similar to household garbage, and comminuted bulk trash, as well as dewatered slurry, to the low-temperature carbonization drum.

As a rule, a rotating, relatively long, low-temperature carbonization drum that has a number of parallel heating tubes on the inside at which the waste is heated, largely with the exclusion of air, is used as the low-temperature carbonization device (pyrolysis reactor). The low-temperature carbonization drum rotates about its longitudinal axis. Preferably, the longitudinal axis of the low-temperature carbonization drum is inclined somewhat from the horizontal, so that the bulk low-temperature carbonization material can collect at the outlet of the low-temperature carbonization drum and from there can be discharged, through a low-temperature carbonization gas and residue discharge housing with a residue drop chute, in the direction of a residue separator device.

In the low-temperature carbonization drum, the low-temperature carbonization material is heated by the heating tubes. To that end, the heating gas flows through the heating tubes disposed in the longitudinal direction of the low-temperature carbonization drum. The procedure as a rule is based on the countercurrent principle. In other words, the heating gas enters in the region of the hot end of the drum and leaves the low-temperature carbonization drum in the region of its cold end. The problem that arises then is that there is a relatively high need for heat energy in the region of the cold end of the drum and a relatively slight need for heat energy in the region of the hot end of the drum. The higher energy requirement arises particularly in the drying of the low-temperature carbonization material, and the lesser energy requirement arises in the low-temperature carbonization thereof. The relatively high heat energy requirement occurs approximately in the region between 0 and $\frac{2}{3}$ of the total length of the low-temperature carbonization drum, as seen in the direction of transport of the trash, and the slight energy requirement occurs approximately in the region between $\frac{2}{3}$ and the total length of the low-temperature carbonization drum.

However, with this kind of countercurrent principle it has been found that a high heating gas temperature and a high heating gas flow velocity occur in the region of the relatively slight energy requirement. The heat transfer from the heating gas to the heating tube and from there to the bulk material is thus relatively good. Conversely, in the region of the high energy requirement, a lower heating gas temperature results, since in the meantime the heating gas is cooled down. The result is a lower heating gas velocity and finally a markedly poorer heat transfer from the heating gas to the heating tubes and thus to the trash located in the low-temperature carbonization drum.

SUMMARY OF THE INVENTION:

It is accordingly an object of the invention to provide a bulk material heating chamber equipped with heating tubes, which overcomes the hereinafore-mentioned disadvantages of the heretofore-known devices of this general type and in which heat transfer is improved in a region of high energy requirement, or in other words a region of lower heating gas temperature.

With the foregoing and other objects in view there is provided, in accordance with the invention, in a heating chamber or low-temperature carbonization drum having an interior receiving bulk material or trash and having a longitudinal axis about which the heating chamber or drum is rotatable, the improvement comprising a number of heating tubes through which a heating gas can flow in a given direction, the heating tubes being disposed in the interior of the heating chamber or drum, being oriented approximately parallel to one another, and having an end region as seen in the given flow direction; and turbulators disposed inside the heating tubes in the end region.

With the aid of the turbulators, high turbulence is generated in the region of the high energy demand, at the boundary layer on the inner wall of the applicable heating tube. This involves an increase in the mean heating gas velocity. The result is an improvement in the heat transfer.

In accordance with another feature of the invention, the turbulators are turbulator rings which are spaced apart from one another and are preferably formed of a stainless steel.

In accordance with a further feature of the invention, the turbulator rings have a rectangular and especially a square cross section or a round cross section.

In accordance with an added feature of the invention, there are provided at least two spacer wires maintaining the turbulator rings at a predetermined spacing from one another.

In accordance with an additional feature of the invention, the spacer wires are secured to the turbulator rings inside or outside the turbulator rings.

In accordance with yet another feature of the invention, there are provided positive displacement bodies disposed inside the end region of the heating tubes.

In accordance with yet a further feature of the invention, each of the positive displacement bodies is secured centrally in a respective one of the heating tubes.

In accordance with yet an added feature of the invention, each of the positive displacement bodies has two ends and three support feet on each of the ends, securing each of the positive displacement bodies in a respective one of the heating tubes.

In accordance with yet an additional feature of the invention, the positive displacement bodies are substantially cylindrical or substantially conical.

In accordance with again another feature of the invention, the positive displacement bodies have a length extending over a plurality of the turbulator rings.

In accordance with again a further feature of the invention, the positive displacement bodies are formed of a stainless steel.

In accordance with a concomitant feature of the invention, the trash can be fed in by the countercurrent principle relative to the given flow direction of the heating gas, and the turbulators are disposed approximately in the last two-thirds of the length of the heating tubes, as seen in the given flow direction.

Other features which are considered as characteristic for the invention are set forth in the appended claims.

Although the invention is illustrated and described herein as embodied in a bulk material heating chamber equipped with heating tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
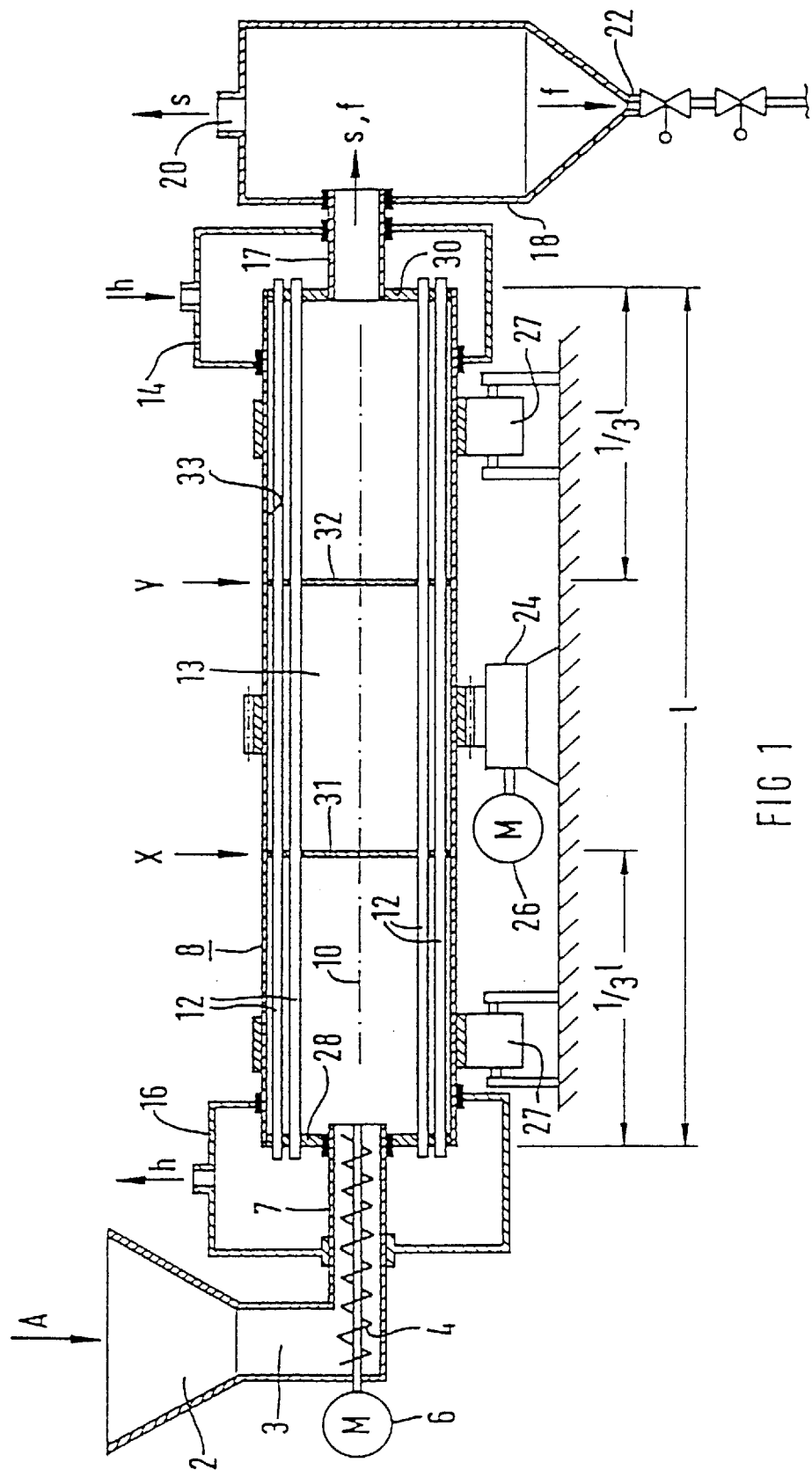
FIG. 1 is a diagrammatic, partly-sectional view of an inlet portion of an low-temperature carbonization-combustion system, having an low-temperature carbonization drum with heating tubes through which heating gas flows according to the countercurrent principle.

DESCRIPTION OF THE PREFERRED EMBODIMENTS:

Referring now to the figures of the drawing in detail and first, particularly, to FIG. 1 thereof, it is seen that bulk trash A is introduced centrally into a pyrolysis reactor or low-temperature carbonization chamber 8 through a feed or charging device 2 with a drop chute 3 and through a worm 4 that is driven by a motor 6 and is disposed in a charging tube 7. In the exemplary embodiment, the low-temperature carbonization chamber 8 is an internally heatable low-temperature carbonization or pyrolysis drum which is rotatable about its longitudinal axis 10, which can have a length of 15 to 30 m, which operates at 300° to 600° C., which is operated largely to the exclusion of oxygen, and which generates not only volatile low-temperature carbonization gases but also a largely solid pyrolysis residue f. The low-temperature carbonization drum 8 has a number of heating tubes 12 (such as 50 to 200) oriented parallel to one another inside the drum. Only four of the heating tubes 12 are shown in FIG. 1 as being disposed in an interior 13. On the right-hand or "hot" end there is an inlet for heating gas h, in the form of a horizontal sealed heating gas inlet chamber 14, and on the left-hand or "cold" end there is an outlet for the heating gas h, in the form of a horizontal sealed heating gas outlet chamber 16. The longitudinal axis 10 of the low-temperature carbonization drum 8 is preferably inclined relative to the horizontal, so that an outlet for the trash A on the right-hand, "hot" end is at a lower level than the inlet on the left for the trash A. The low-temperature carbonization drum 8 is preferably kept at a slight negative pressure relative to its surroundings.

The pyrolysis drum 8 is followed on the output or discharge side by a central discharge tube 17 that rotates with it.

The central discharge tube 17 is followed by a discharge device 18 which is provided with a low-temperature carbonization gas discharge stub 20 for removing the low-temperature carbonization gas s and with a pyrolysis residue outlet 22 for discharging the solid pyrolysis residue f. A low-temperature carbonization gas line connected to the low-temperature carbonization gas discharge stub 20 communicates with a non-illustrated burner of a high-temperature combustion chamber.

The rotary motion of the low-temperature carbonization drum 8 about its longitudinal axis 10 is effected by a drive having a gear 24 that is connected to a motor 26. The drive 24, 26 operates upon a gear ring, for instance, that is secured to the periphery of the low-temperature carbonization drum 8. Bearings of the low-temperature carbonization drum 8 are indicated by reference numeral 27.

It becomes clear from FIG. 1 that the heating tubes 12 are each secured at one end to a first end plate 28 and at another end to a second end plate 30. The fastening to the end plates 28, 30 is made in such a way that easy replacement of the heating tubes 12 preferably results. The end of each of the heating tubes 12 protrudes out of the interior 13 through an opening to the left into the outlet chamber 16 and to the right into the inlet chamber 14. An axis of the heating tubes 12 is oriented perpendicularly to the surface of the end plates 28, 30. In the construction shown, it has been taken into consideration that the individual heating tubes 12 are under severe thermal and mechanical strain, and that the end plates 28, 30, which can also be called tube plates or drum tube bottoms, rotate as well about the longitudinal axis 10 of the low-temperature carbonization drum 8.

Two support points X, Y are provided between the end plates 28, 30 for supporting the heating tubes 12 (which otherwise might possibly sag). As viewed in the transport direction of the trash A, the first support point X is located at approximately one-third (⅓ 1) and the second support point Y is located at approximately two-thirds (⅔ 1) of a total length 1 of the low-temperature carbonization drum 8. In this case, support brackets 31, 32 in the form of rounded perforated plates of metal, for instance steel, are secured to an inner wall 33.

Figure 2:
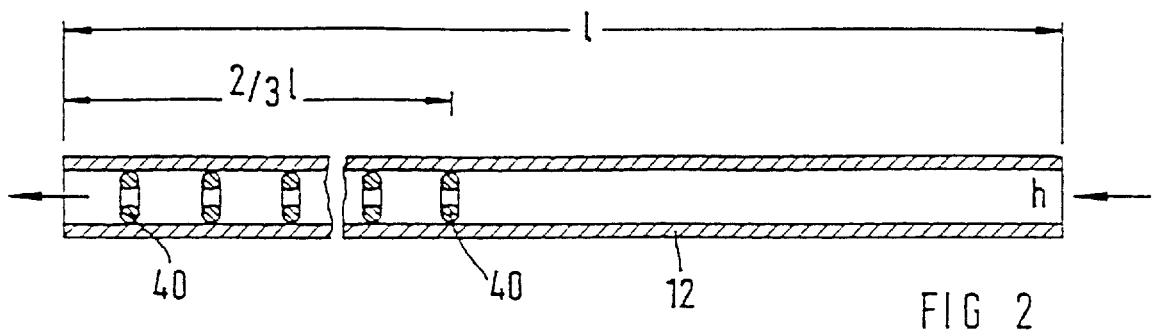
FIG. 2 is a fragmentary, longitudinal-sectional view of a heating tube for a low-temperature carbonization drum with a number of annular turbulators inserted.

In FIG. 2, the heating gas h flows in the direction of the arrow through the heating tube 12. In the left-hand portion of the heating tube 12, namely in the location where a good heat transfer to the trash A entering the low-temperature carbonization drum should take place for the sake of evaporating the moisture it contains, or in other words in the end region or especially the last two-thirds of the length 1 (as seen in the flow direction of the heating gas h), a number of turbulators 40 is provided in the interior. In particular, these are annular turbulators or turbulator rings, which are disposed at uniform or nonuniform spacing from one another along the flow direction. They preferably are formed of a stainless steel. The turbulators 40 serve in the ⅔ 1 region of the heating tube 12 to generate high turbulence at the boundary layer and thus to increase the gas velocity. The result is a better heat transfer of the heating gas, which of course cools down along its way from right to left.

Figure 3:
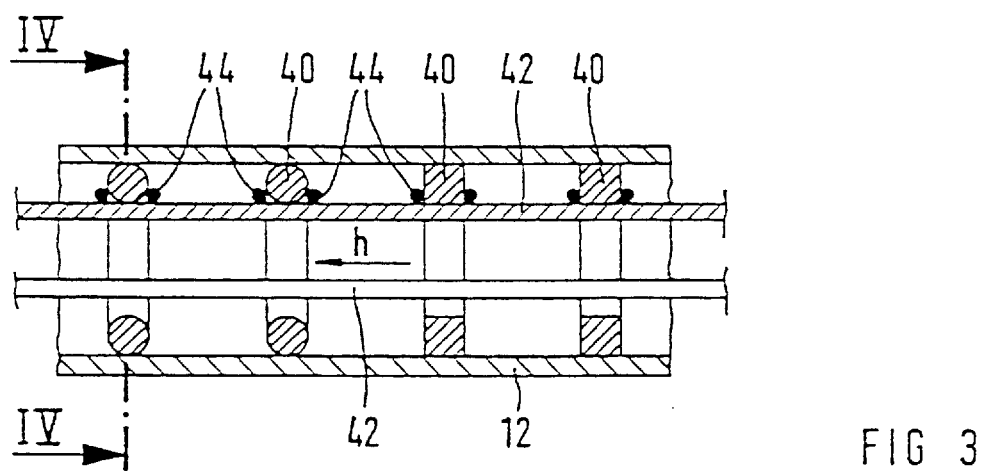
FIG. 3 is an enlarged, fragmentary, longitudinal-sectional view of a portion of one such heating tube.
Figure 4:
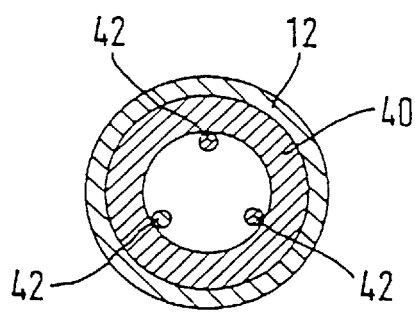
FIG. 4 is a cross-sectional view of the heating tube which is taken along the line IV—IV of FIG. 3, in the direction of the arrows.

It becomes clear from FIGS. 3 and 4 that the turbulator rings 40 may have a round or rectangular cross section and in particular a square cross section.

The turbulator rings 40 are accommodated in this case in the interior of the heating tube 12 with the aid of three spacer and retaining wires 42 extending longitudinally. Weld points between the turbulator rings 40 and the spacer wires 42 are indicated by reference numeral 44. In FIGS. 3 and 4, the turbulator rings 40 rest on the inner wall surface of the heating tube 12. In their operative range, the turbulator rings reduce the free flow cross section for the heating gas h, thus increasing the flow velocity and causing turbulence to develop. Thus, as already noted, the heat transfer from the heating gas h to the heating tube 12 and from there to the trash is increased.

Figure 5:
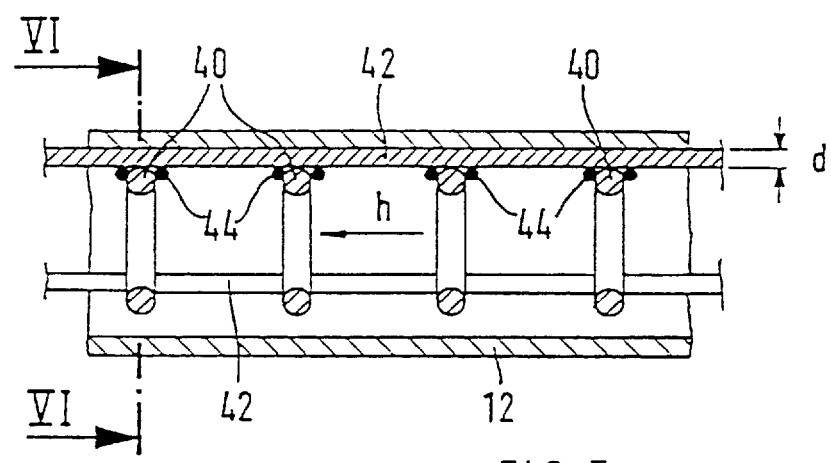
FIG. 5 is an enlarged, fragmentary, longitudinal-sectional view of a portion of a heating tube with a modified configuration of the annular turbulators inserted.
Figure 6:
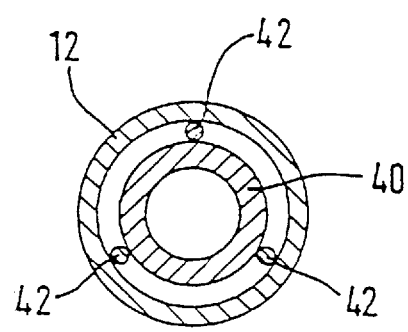
FIG. 6 is a cross-sectional view of the heating tube which is taken along the line VI—VI of FIG. 5, in the direction of the arrows.

Another embodiment is shown in FIGS. 5 and 6. In this case the turbulator rings 40 are kept at a specific distance or spacing d from the inner wall surface of the heating tube 12. A concentric configuration is preferred. In order to maintain this spacing d and the mutual spacing of the turbulator rings 40, the retaining wires 42 are again provided. In this case, these wires are disposed on the outside of the individual turbulator rings 40 and secured there by weld seams 44. The thickness d of the retaining wires 42 is equivalent to the spacing d between the outer diameter of the turbulator rings 40 and the inner diameter of the heating tube 12. The effect on the heat transfer is practically the same as in the embodiment of FIGS. 3 and 4.

Figure 7:
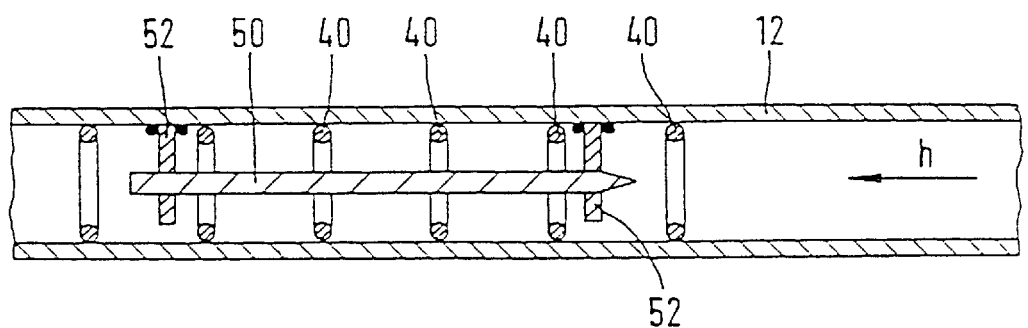
FIG. 7 is a fragmentary, longitudinal-sectional view of a heating tube with inserted turbulators and with an inserted positive displacement body in accordance with a first embodiment.
Figure 8:
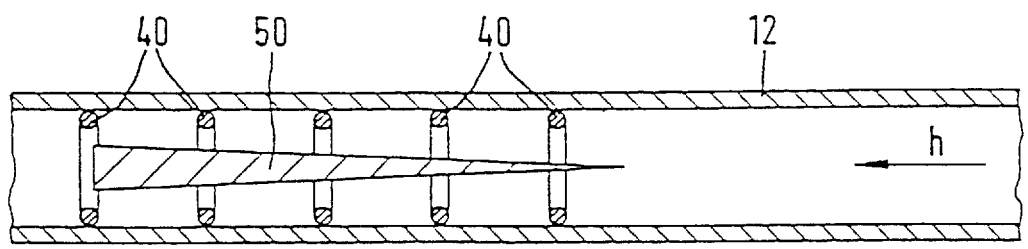
FIG. 8 is a fragmentary, longitudinal-sectional view of a heating tube with inserted turbulators and with a positive displacement body in accordance with a second embodiment.

In FIGS. 7 and 8, further features are shown. It has already been mentioned that as the heating gas h cools, its flow velocity decreases. At least one positive displacement body 50 is disposed, in particular, centrally in the heating tube 12 but does not increase this flow velocity again. In combination with the turbulators 40 described above, the result is again an increase in the heat transfer. Thus, over the entire length 1 of the individual heating tubes 12 a virtually uniform heat transfer from the heating gas h to the wall of the applicable heating tube 12 can be attained, despite cooling of the heating gas h. These provisions can have the result of permitting the length of the low-temperature carbonization 8 to be made shorter, as compared with the conventional version. This makes for a notable reduction in the production price of the low-temperature carbonization drum 8.

FIG. 7 shows that the positive displacement body 50, which is preferably formed of a stainless steel, can be constructed to be essentially cylindrical. One tip of the positive displacement body 50 faces into the heating gas H. Conversely, in FIG. 8 the positive displacement body 50, which again can be formed of a stainless steel, can be constructed as a pyramid or a cone. Once again, the tip of the positive displacement body 50 faces into the flow.

The positive displacement bodies 50 of FIGS. 7 and 8 are each secured centrally in the heating tube 12. To this end, three support feet 52 that are offset from one another axially by 120° are provided on each of the front and rear ends of each of the positive displacement bodies 50. Such support feet 52 are shown only in FIG. 7, for the sake of simplicity. The length of each positive displacement body 50 extends over a plurality of turbulator rings 40. A plurality of positive displacement bodies 50 may be provided along the total path of ⅔ 1.

We claim:

1. In a heating chamber having an interior receiving bulk material and having a longitudinal axis about which the heating chamber is rotatable, the improvement comprising:
a number of heating tubes through which a heating gas can flow in a given direction, said heating tubes being disposed in the interior of the heating chamber, being oriented approximately parallel to one another, and having an end region as seen in said given flow direction; and
turbulators disposed inside said heating tubes and only in said end region.

2. The heating chamber according to claim 1, wherein said turbulators are spaced-apart turbulator rings.

3. The heating chamber according to claim 2, wherein said turbulator rings are formed of a stainless steel.

4. The heating chamber according to claim 2, wherein said turbulator rings have a rectangular cross section.

5. The heating chamber according to claim 2, wherein said turbulator rings have a round cross section.

6. The heating chamber according to claim 2, including at least two spacer wires maintaining said turbulator rings at a predetermined spacing from one another.

7. The heating chamber according to claim 6, wherein said spacer wires are secured to said turbulator rings inside said turbulator rings.

8. The heating chamber according to claim 6, wherein said spacer wires are secured to said turbulator rings outside said turbulator rings.

9. The heating chamber according to claim 2, including positive displacement bodies disposed inside said end region of said heating tubes.

10. The heating chamber according to claim 9, wherein each of said positive displacement bodies is secured centrally in a respective one of said heating tubes.

11. The heating chamber according to claim 10, wherein each of said positive displacement bodies has two ends and three support feet on each of said ends, securing each of said positive displacement bodies in a respective one of said heating tubes.

12. The heating chamber according to claim 9, wherein said positive displacement bodies are substantially cylindrical.

13. The heating chamber according to claim 9, wherein said positive displacement bodies are conical.

14. The heating chamber according to claim 9, wherein said positive displacement bodies have a length extending over a plurality of said turbulator rings.

15. The heating chamber according to claim 9, wherein said positive displacement bodies are formed of a stainless steel.

16. The heating chamber according to claim 1, wherein the bulk material is fed in in a direction opposite to said given flow direction of the heating gas, and said turbulators are disposed approximately in the last two-thirds of the length of said heating tubes, as seen in said given flow direction of the heating gas.

17. In a low-temperature carbonization drum having an interior receiving trash and having a longitudinal axis about which the drum is rotatable, the improvement comprising:

a number of heating tubes through which a heating gas can flow in a given direction, said heating tubes being disposed in the interior of the drum, being oriented approximately parallel to one another, and having an end region as seen in said given flow direction; and turbulators disposed inside said heating tubes and only in said end region.

* * * * *